(12) United States Patent
Yu et al.

(10) Patent No.: US 12,725,007 B2
(45) Date of Patent: Sep. 1, 2026

(54) ADAPTIVELY COMPRESSING A DEEP LEARNING MODEL

(71) Applicant: INTERNATIONAL BUSINESS MACHINES CORPORATION, Armonk, NY (US)

(72) Inventors: Chao Yu, Ningbo (CN); Kun Yan Yin, Ningbo (CN); Ming Jin Chen, Zhe Jiang (CN); Teng Sun, Beijing (CN); Guang Qing Zhong, Beijing (CN)

(73) Assignee: International Business Machines Corporation, Armonk, NY (US)

(*) Notice: Subject to any disclaimer, the term of this patent is extended or adjusted under 35 U.S.C. 154(b) by 1067 days.

(21) Appl. No.: 17/449,652

(22) Filed: Sep. 30, 2021

(65) Prior Publication Data

US 2023/0103149 A1 Mar. 30, 2023

(51) Int. Cl.
*G06N 3/045* (2023.01)

(52) U.S. Cl.
CPC .................................... *G06N 3/045* (2023.01)

(58) Field of Classification Search
CPC ...................................................... G06N 3/045
See application file for complete search history.

(56) References Cited

U.S. PATENT DOCUMENTS 6,608,924 B2 8/2003 Soliman
2018/0241852 A1 8/2018 Maluf
2019/0057308 A1* 2/2019 Cho ........................ G06N 3/082
2019/0205767 A1* 7/2019 Zhang ...................... G06N 3/08
2019/0349356 A1* 11/2019 McElwee .............. G06F 21/552
2020/0104716 A1* 4/2020 Venkatesha ............ G06N 3/045
2020/0137420 A1 4/2020 Natanzon
2020/0285983 A1 9/2020 Bhattacharyya
2021/0027166 A1* 1/2021 Gorokhov ................ G06N 5/04
2021/0042889 A1* 2/2021 Pei ......................... G06N 3/063
2022/0217792 A1* 7/2022 Yu .......................... G06N 3/044

(Continued)

OTHER PUBLICATIONS

Reiners, Malena, Kathrin Klamroth, and Michael Stiglmayr. "Efficient and Sparse Neural Networks by Pruning Weights in a Multiobjective Learning Approach." (2020). (Year: 2020).*

(Continued)

*Primary Examiner* — Kakali Chaki
*Assistant Examiner* — Charles Jeffrey Jones
(74) *Attorney, Agent, or Firm* — Harrity & Harrity, LLP

(57) ABSTRACT

An approach is provided for adaptively compressing a deep learning model. An original deep learning model for different Internet of Things (IoT) devices is determined. Device information is collected from the IoT devices. Based on the device information, multiple recommendation engines are selected from a set of recommendation engines. Compression factor combinations are determined by using the multiple recommendation engines. Compression ratios and model accuracies for the compression factor combinations are determined. Based on the compression ratios and the model accuracies, an optimal compression factor combination is selected from the compression factor combinations. A compressed deep learning model is generated by compressing the original deep learning model by using the optimal compression factor. The compressed deep learning model is deployed to the IoT devices.

19 Claims, 8 Drawing Sheets

(56) References Cited

U.S. PATENT DOCUMENTS

| | | | | |
|---|---|---|---|---|
| 2022/0292666 | A1* | 9/2022 | Zhang | G06F 18/24 |
| 2024/0007414 | A1* | 1/2024 | Jain | G06F 9/5088 |

OTHER PUBLICATIONS

Chowdhury, Mayukh Roy et al.; Adaptive Multivariate Data Compression in Smart Metering Internet of Things; IEEE Transactions on Industrial Informatics (vol. 17, Issue 2); Feb. 2021; 11 pages.

Gordon, Mitchell et al.; Compressing BERT Studying the Effects of Weight Pruning on Transfer Learning; arXiv:2002.08307v2 [cs. CL]; May 14, 2020; 15 pages.

Lan, Zhenzhong et al.; ALBERT A Lite BERT for Self-supervised Learning of Language Representations; arXiv:1909.11942v1 [cs. CL]; Sep. 26, 2019; 16 pages.

Mccarley, J.S.; Pruning a BERT-based Question Answering Model; arXiv:1910.06360v1 [cs.CL]; Oct. 14, 2019; 5 pages.

Mell, Peter et al.; "The NIST Definition of Cloud Computing;" National Institute of Standards and Technology; Special Publication 800-145; Sep. 2011; 7 pages.

Sanh, Victor et al.; DistilBERT a distilled version of BERT smaller faster cheaper and lighter; arXiv:1910.01108v2 [cs.CL]; Oct. 16, 2019; 5 pages.

Toderici, George et al.; Variable rate image compression with recurrent neural networks; arXiv:1511.06085v5 [cs.CV]; Mar. 1, 2016; 12 pages.

Wang, Ziheng et al.; Structured Pruning of Large Language Models; Proceedings of the 2020 Conference on Empirical Methods in Natural Language Processing; Nov. 16-20, 2020; pp. 6151-6162.

* cited by examiner

ADAPTIVELY COMPRESSING A DEEP LEARNING MODEL

BACKGROUND

The present invention relates to model compression techniques, and more particularly to neural network model compression on different Internet of Things (IoT) devices.

Edge computing is a topology-sensitive and location-sensitive form of distributed computing. With the development of edge computing, edge devices are diverse and jumbled, and can include, for example, servers, mobile devices, neural compute sticks, compute boxes, etc.

Known model compression techniques provide a compressed machine learning model that is simplified from an original machine learning model without significantly diminishing its accuracy. A compressed model is one that is reduced in size and/or latency as compared to the original model. In the case of size reduction, the compressed model has fewer and/or smaller parameters and thereby uses less memory resources when executed. Using less memory resources allows memory to be freed up for use by other parts of the application. In the case of latency reduction, the compressed model takes less time to make a prediction (i.e., an inference) based on an input to the trained model, thereby consuming less energy at runtime. Known model compression techniques in the field of deep learning include adaptive dropout network, reduced parameter count, weight sharing, and student-teacher mechanism (i.e., knowledge distillation).

SUMMARY

In one embodiment, the present invention provides a computer system that includes a central processing unit (CPU), a memory coupled to the CPU, and one or more computer readable storage media coupled to the CPU. The one or more computer readable storage media collectively contain instructions that are executed by the CPU via the memory to implement a method of adaptively compressing a deep learning model. The method includes the computer system determining an original deep learning model for different Internet of Things (IoT) devices. The method further includes the computer system collecting device information from the IoT devices. The method further includes based on the collected device information, the computer system selecting multiple recommendation engines from a plurality of recommendation engines. The method further includes the computer system determining compression factor combinations by using the selected multiple recommendation engines. The method further includes the computer system determining compression ratios and model accuracies for the compression factor combinations. The method further includes based on the compression ratios and the model accuracies, the computer system selecting an optimal compression factor combination from the compression factor combinations. The method further includes the computer system generating a compressed deep learning model by compressing the original deep learning model by using the optimal compression factor. The method further includes the computer system deploying the compressed deep learning model to the IoT devices.

A computer program product and a method corresponding to the above-summarized computer system are also described and claimed herein.

DETAILED DESCRIPTION

Overview

Known techniques for model compression for edge devices are limited and inflexible by failing to account for variations in memory and computing capability among different edge devices and failing to account for edge device upgrades and the adding of edge devices. Furthermore, known techniques for model compression includes time-consuming and error-prone manual efforts to choose a compression method and update a compression method in response to an upgrade of an edge device.

Embodiments of the present invention address the aforementioned unique challenges of model compression by providing model compression for different edge devices and for edge devices on a large scale that is reusable and iterative. Embodiments of the present invention provide a model compression technique suitable for different edge devices and a dynamic monitoring of the compression effect on a running process of the model. Embodiments of the present invention provide model compression that includes (i) choosing an adaptive model compression method based on the computing capabilities of different IoT edge devices and (ii) updating the compression model in response to an upgrade of an edge device in order to achieve high accuracy. IoT edge devices are also referred to herein simply as IoT devices.

System for Adaptively Compressing a Deep Learning Model

Figure 1:
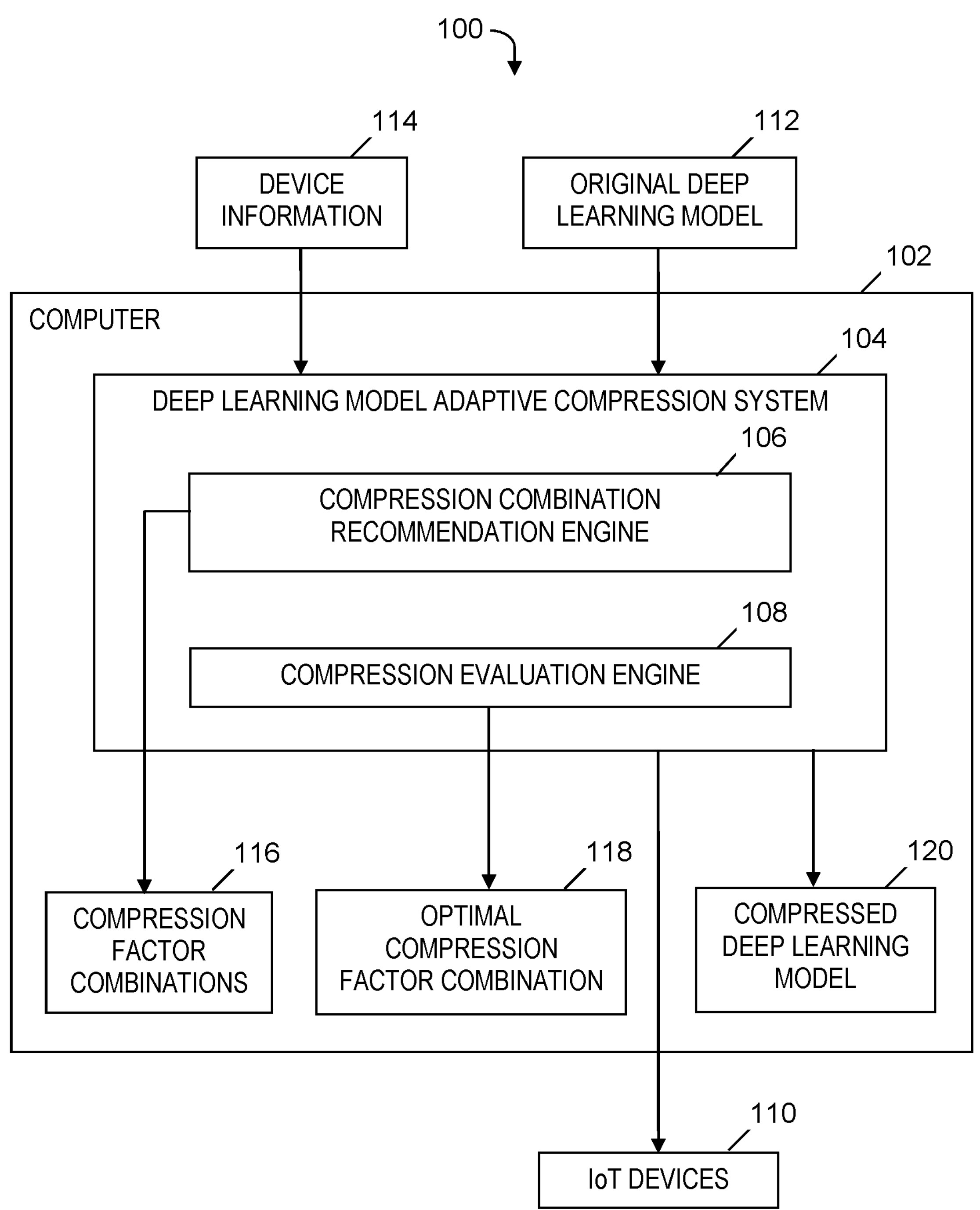
FIG. 1 is a block diagram of a system for adaptively compressing a deep learning model, in accordance with embodiments of the present invention.

FIG. 1 is a block diagram of a system 100 for adaptively compressing a deep learning model, in accordance with embodiments of the present invention. System 100 includes a computer 102 that includes a software-based deep learning model adaptive compression system 104, which includes a compression combination recommendation engine 106 and a compression evaluation engine 108. In one embodiment, computer 102 resides in a cloud computing environment. System 100 also includes IoT devices 110, which include different IoT devices operatively coupled to computer 102 via a computer network (not shown).

Deep learning model adaptive compression system 104 stores compression methods as model compression templates (not shown) in a model compression warehouse (not shown). The templates specify compression methods, such as adaptive dropout network, parameter reduction, weight sharing, and a student-teacher mechanism. In a cloud computing environment, deep learning model adaptive compression system 104 trains an optimal and complete neural network based on training data collected at the edge from IoT devices 110. In an actual compression process, deep learning model adaptive compression system 104 combines the model compression templates together (also known as compression combination).

In one embodiment, compression combination is treated as a recommendation issue. Deep learning model adaptive compression system 104 receives or generates an original deep learning model 112 for IoT devices 110 and receives device information 114 that specify IoT devices 110. Device information 114 includes, for example, brands, hardware, frame sizes, network latencies, pattern types, and model layer sizes of IoT devices 110

Compression combination recommendation engine 106 uses internal recommendation engines (e.g., K-means engine, tag-based engine, and neural network based engine) to generate a series of compression factor combinations 116.

Compression evaluation engine 108 evaluates the series of compression factor combinations 116 based on a validate dataset (not shown). Compression evaluation engine 108 uses measures of compression ratio and model accuracy to generate an optimization score for each of the compression factor combinations 116. Compression evaluation engine 108 identifies an optimal compression factor combination 118 based on the optimization scores. The optimal compression factor combination is suitable for the IoT devices 110 and the original deep learning model 112.

Deep learning model adaptive compression system 104 uses the optimal compression factor combination 118 to compress the original deep learning model 112 to generate a compressed deep learning model 120. Deep learning model adaptive compression system 104 deploys the compressed deep learning model 120 to IoT devices 110.

Although not shown in FIG. 1, system 100 includes a software-based model deviation monitoring component (i.e., model bias monitoring component) at the edge and operatively coupled to computer 102. The model deviation monitoring component monitors and records the accuracy and a rate of change in the accuracy of the compressed deep learning model 120. Based on a recorded rate of a decrease in the accuracy of the compressed deep learning model 120, the model deviation monitoring component either re-compresses the model or re-trains the model, as discussed below relative to FIG. 3.

The functionality of the components shown in FIG. 1 is described in more detail in the discussion of FIG. 2, FIG. 3, FIG. 4, FIG. 5, and FIG. 6 presented below.

Process for Adaptively Compressing a Deep Learning Model

Figure 2:
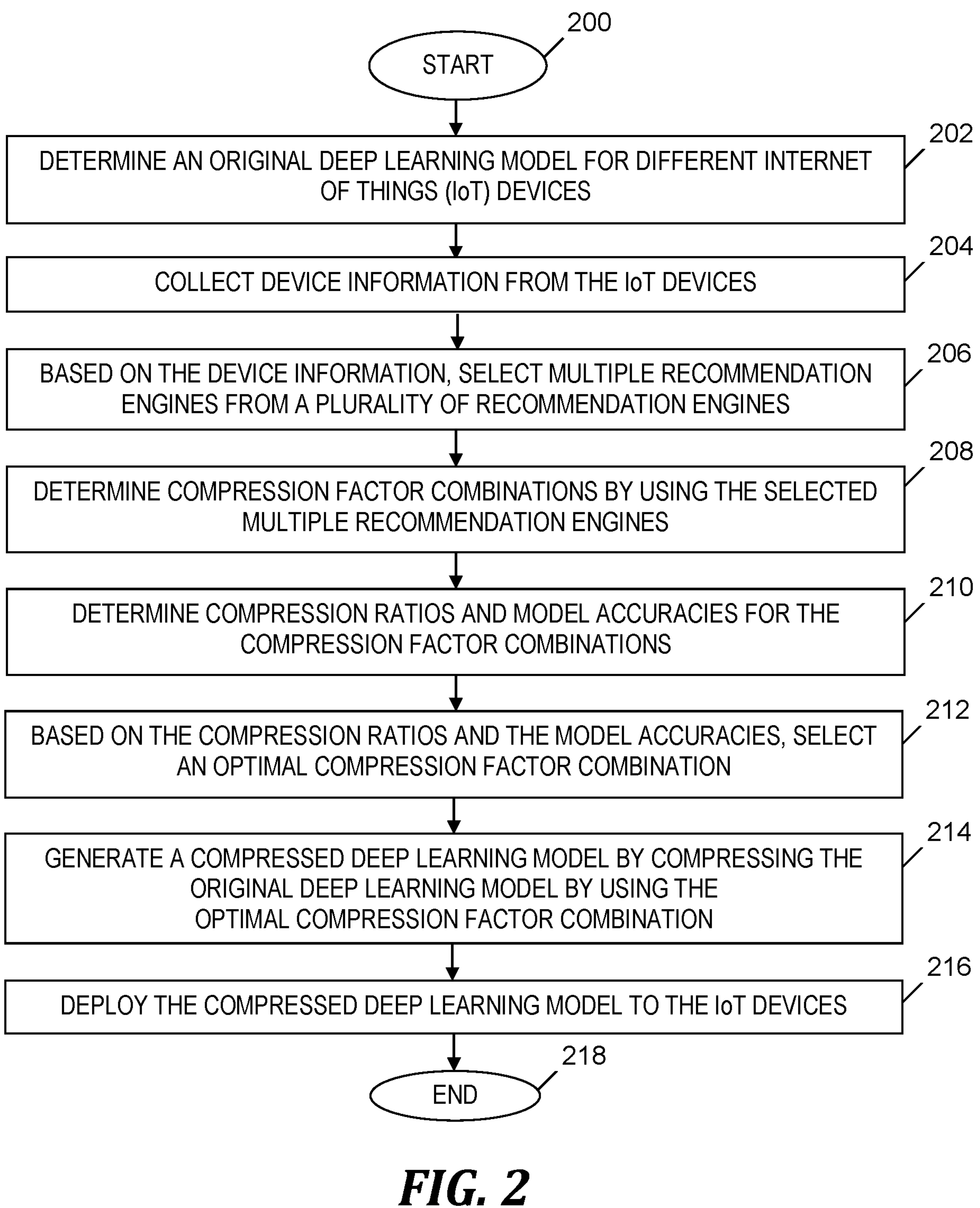
FIG. 2 is a flowchart of a process of adaptively compressing a deep learning model, in accordance with embodiments of the present invention.

FIG. 2 is a flowchart of a process of adaptively compressing a deep learning model, in accordance with embodiments of the present invention. The process of FIG. 2 begins at a start node 200.

Prior to step 202, deep learning model adaptive compression system 104 (see FIG. 1) stores multiple compression methods as templates (referred to herein as model compression templates) in a model compression warehouse. For example, the model compression templates include parameter pruning and sharing, low-rank factorization, transferred/compact convolutional filters, frequency domain converter, and knowledge distillation.

Prior to step 202 and based on training data collected at the edge in system 100 (see FIG. 1), deep learning model adaptive compression system 104 (see FIG. 1) trains an optimal and complete neural network.

In step 202, deep learning model adaptive compression system 104 (see FIG. 1) determines or receives original deep learning model 112 (see FIG. 1) for IoT devices 110 (see FIG. 1). Original deep learning model 112 (see FIG. 1) is also known as an inference model, artificial intelligence model, or a neural network model.

In step 204, deep learning model adaptive compression system 104 (see FIG. 1) collects device information from IoT devices 110 (see FIG. 1). In one embodiment, the device information collected in step 204 includes brands, hardware, frame sizes, network latencies, pattern types, and model layer sizes of IoT devices 110 (see FIG. 1).

In step 206, based on the device information collected in step 204, compression combination recommendation engine 106 (see FIG. 1) selects multiple recommendation engines (i.e., internal recommendation engines) from a plurality of recommendation engines. For example, the selected recommendation engines include a K-means engine, a tag-based engine, and a graph embedding engine (i.e., a neural network engine).

In one embodiment, subsequent to step 204, deep learning model adaptive compression system 104 (see FIG. 1) weights the items in the collected device information by respective weights that are predefined and received by deep learning model adaptive compression system 104 (see FIG. 1) prior to step 206. Step 206 includes selecting the multiple recommendation engines from the plurality of recommendation engines based on the weighted device information.

In step 208, compression combination recommendation engine 106 (see FIG. 1) determines compression factor combinations by using the multiple recommendation engines selected in step 206 and by combining the model compression templates.

If the number of model compression templates is n, then without using the compression combination recommendation engine 106 (see FIG. 1), the number of compression factor combinations is n!. In one embodiment, compression combination recommendation engine 106 (see FIG. 1) performs filtering by using the multiple recommendation engines to decrease the n! number of compression factor combinations to a substantially lower number.

After step 208 and prior to step 210, compression combination recommendation engine 106 (see FIG. 1) sends the compression factor combinations to compression evaluation engine 108 (see FIG. 1).

In step 210, based on a validate dataset, compression evaluation engine 108 (see FIG. 1) evaluates the compression factor combinations determined in step 208 and determines respective compression ratios and respective model accuracies for the compression factor combinations.

In step 212, based on the compression ratios and the model accuracies determined in step 210, compression evaluation engine 108 (see FIG. 1) selects an optimal compression factor combination from the compression factor combinations determined in step 208.

In one embodiment, compression evaluation engine 108 (see FIG. 1) determines respective optimization scores for the compression factor combinations by weighting the compression ratios and the model accuracies and then combining (e.g., adding) the weighted compression ratios and weighted model accuracies. Compression evaluation engine 108 (see FIG. 1) identifies the optimal compression factor combination as the compression factor combination whose optimization score is greater than the other optimization scores.

In step 214, deep learning model adaptive compression system 104 (see FIG. 1) generates compressed deep learning model 120 (see FIG. 1) by compressing original deep learning model 112 (see FIG. 1) by using the optimal compression factor combination selected in step 212.

In step 216, deep learning model adaptive compression system 104 (see FIG. 1) deploys the compressed deep learning model 120 (see FIG. 1) to IoT devices 110 (see FIG. 1). After completing the process of FIG. 2, the compressed deep learning model 120 (see FIG. 1) is the result of being adaptively compressed without decreasing the accuracy of the model as compared to the accuracy of the original deep learning model 112 (see FIG. 1).

Following step 216, the process of FIG. 2 ends at an end node 218.

Figure 3:
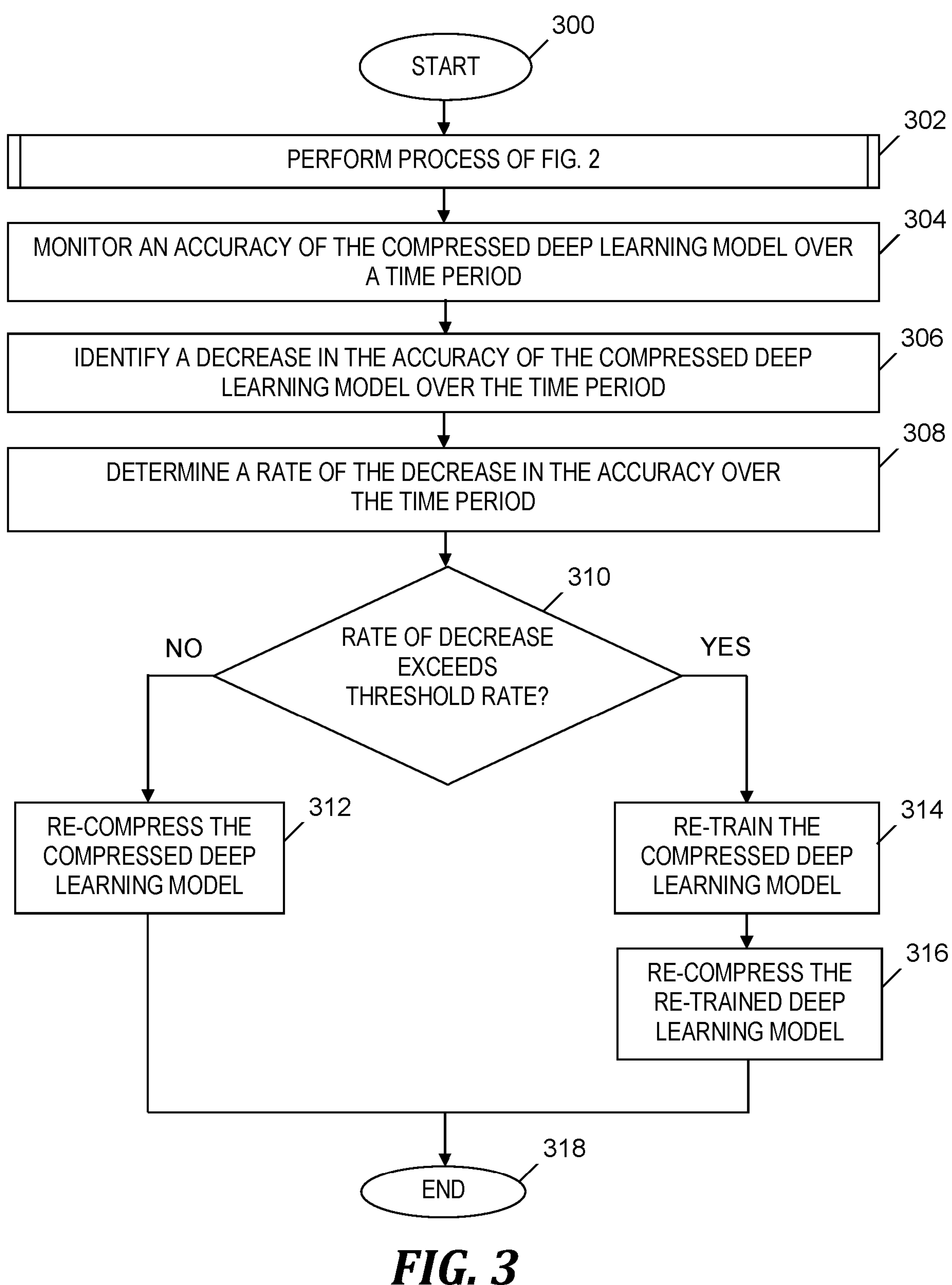
FIG. 3 is a flowchart of a process of model bias monitoring that is performed subsequent to the process of FIG. 2, in accordance with embodiments of the present invention.

FIG. 3 is a flowchart of a process of model bias monitoring that is performed subsequent to the process of FIG. 2, in accordance with embodiments of the present invention. The process of FIG. 3 begins at a start node 300. In step 302, the process of FIG. 2 is performed. In step 304, a model deviation monitoring component at the edge in system 100 (see FIG. 1) monitors an accuracy of a running process of the compressed deep learning model 120 (see FIG. 1) over a time period that exceeds a specified amount of time.

In step 306, the model deviation monitoring component identifies a decrease in the accuracy of the running process of the compressed deep learning model 120 (see FIG. 1) over the aforementioned time period. In one embodiment, the decrease in accuracy identified in step 306 is caused by IoT devices 110 (see FIG. 1) being upgraded in hardware or in operating system version.

In step 308, the model deviation monitoring component determines a rate of the decrease in the accuracy of the running process of the compressed deep learning model 120 (see FIG. 1) over the aforementioned time period. Hereinafter, in the discussion of FIG. 3, the rate determined in step 308 is referred to as the rate of decrease.

In step 310, the model deviation monitoring component determines whether the rate of decrease exceeds a specified threshold rate, where the model deviation monitoring component receives the specified threshold rate prior to step 310.

If the model deviation monitoring component determines in step 310 that the rate of decrease does not exceed the threshold rate (i.e., a curve representing the accuracy over the time period decreases steadily), then the No branch of step 310 is followed and step 312 is performed.

In step 312, deep learning model adaptive compression system 104 (see FIG. 1) re-compresses the compressed deep learning model 120 (see FIG. 1) by performing the steps of the process of FIG. 2, where compressed deep learning model 120 (see FIG. 1) acts as the original deep learning model and the re-compressed deep learning model is generated and deployed to IoT devices 110 (see FIG. 1) in steps 214 and 216, respectively.

Returning to step 310, if the model deviation monitoring component determines that the rate of decrease exceeds the threshold rate (i.e., a curve representing the accuracy over the time period decreases rapidly), then the Yes branch of step 310 is followed and step 314 is performed.

In step 314, deep learning model adaptive compression system 104 (see FIG. 1) re-trains the compressed deep learning model 120 (see FIG. 1) to generate a retrained deep learning model.

In step 316, deep learning model adaptive compression system 104 (see FIG. 1) re-compresses the re-trained deep learning model generated in step 314 to generate a re-compressed deep learning model. The re-compressing in step 316 is completed by performing the steps of the process of FIG. 2, where the re-trained deep learning model acts as the original deep learning model and the re-compressed deep learning model is generated and deployed to IoT devices 110 (see FIG. 1) in steps 214 and 216, respectively.

Following step 314 and following step 316, the process of FIG. 3 ends at an end node 318.

EXAMPLES

Figure 4:
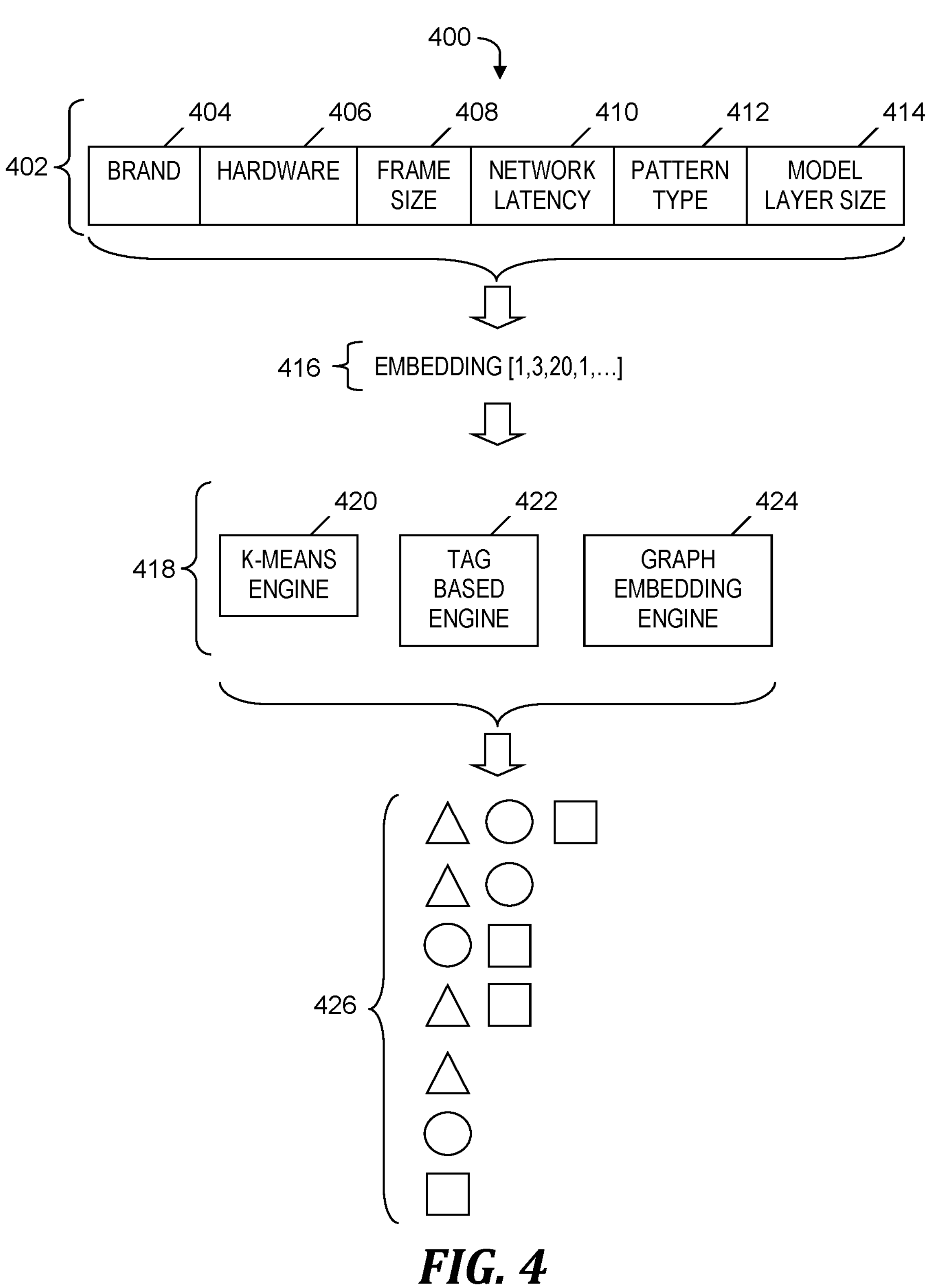
FIG. 4 is an example of generating a series of compression factor combinations within the process of FIG. 2, in accordance with embodiments of the present invention.

FIG. 4 is an example 400 of generating a series of compression factor combinations within the process of FIG. 2, in accordance with embodiments of the present invention. In step 204 (see FIG. 2), deep learning model adaptive compression system 104 (see FIG. 1) collects device information 402 from IoT devices 110 (see FIG. 1). The device information 402 for each IoT device includes a brand 404, hardware 406, frame size 408, network latency 410, pattern type 412, and model layer size 414.

Subsequent to step 204 (see FIG. 2) and prior to step 206 (see FIG. 2), deep learning model adaptive compression system 104 (see FIG. 1) performs embedding by assigning the weights 1, 3, 20, 1, etc. to brand 404, hardware 406, frame size 408, network latency 410, etc., respectively. In step 206, compression combination recommendation engine 106 (see FIG. 1) selects internal recommendation engines 418, which consist of K-means engine 420, tag-based engine 422, and graph embedding engine 424.

In step 208, compression combination recommendation engine 106 (see FIG. 1) determines a series of seven compression factor combinations 426. The triangle, circle, and square icons in the compression factor combinations 426 represent different model compression solutions specified by model compression templates.

In example 400, K-means engine 420 uses embedding vector similarity to provide two of the combinations in compression factor combinations 426; tag-based engine 422 uses pattern type similarity to provide three of the combinations in compression factor combinations 426; and graph embedding engine 424 uses a graph embedding method to provide two of the combinations in compression factor combinations 426.

Figure 5:
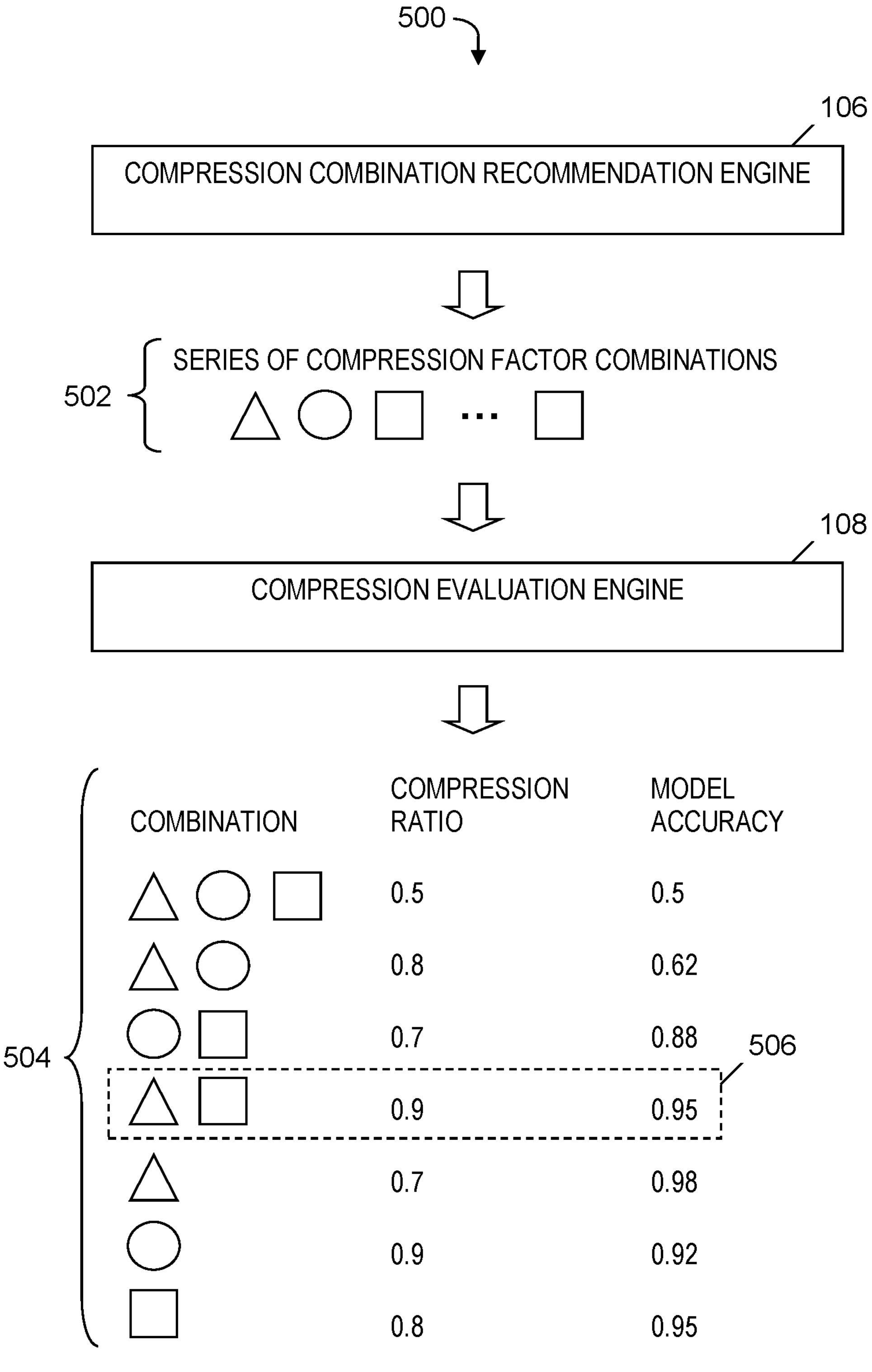
FIG. 5 is an example of selecting an optimal compression factor combination within the process of FIG. 2, in accordance with embodiments of the present invention.

FIG. 5 is an example 500 of selecting an optimal compression factor combination within the process of FIG. 2, in accordance with embodiments of the present invention. In step 208 (see FIG. 2), compression combination recommendation engine 106 generates a series of compression factor combinations 502 and sends the series of compression factor combinations 502 to compression evaluation engine 108.

In step 210, compression evaluation engine 108 determines a table 504 of compression ratios and model accuracies corresponding to the compression factor combinations 502. Prior to step 212 (see FIG. 2), compression evaluation engine determines optimization scores (not shown) for the compression factor combinations 502, where the optimization scores are based on weighted compression ratios and weighted model accuracies. In step 212 (see FIG. 2) compression evaluation engine 108 selects an optimal compression factor combination 506 because the optimization score based on a weighted compression ratio of 0.9 and a weighted model accuracy of 0.95 for the combination represented by the triangle and square is greater than the optimization scores for the other combinations.

Computer System

Figure 6:
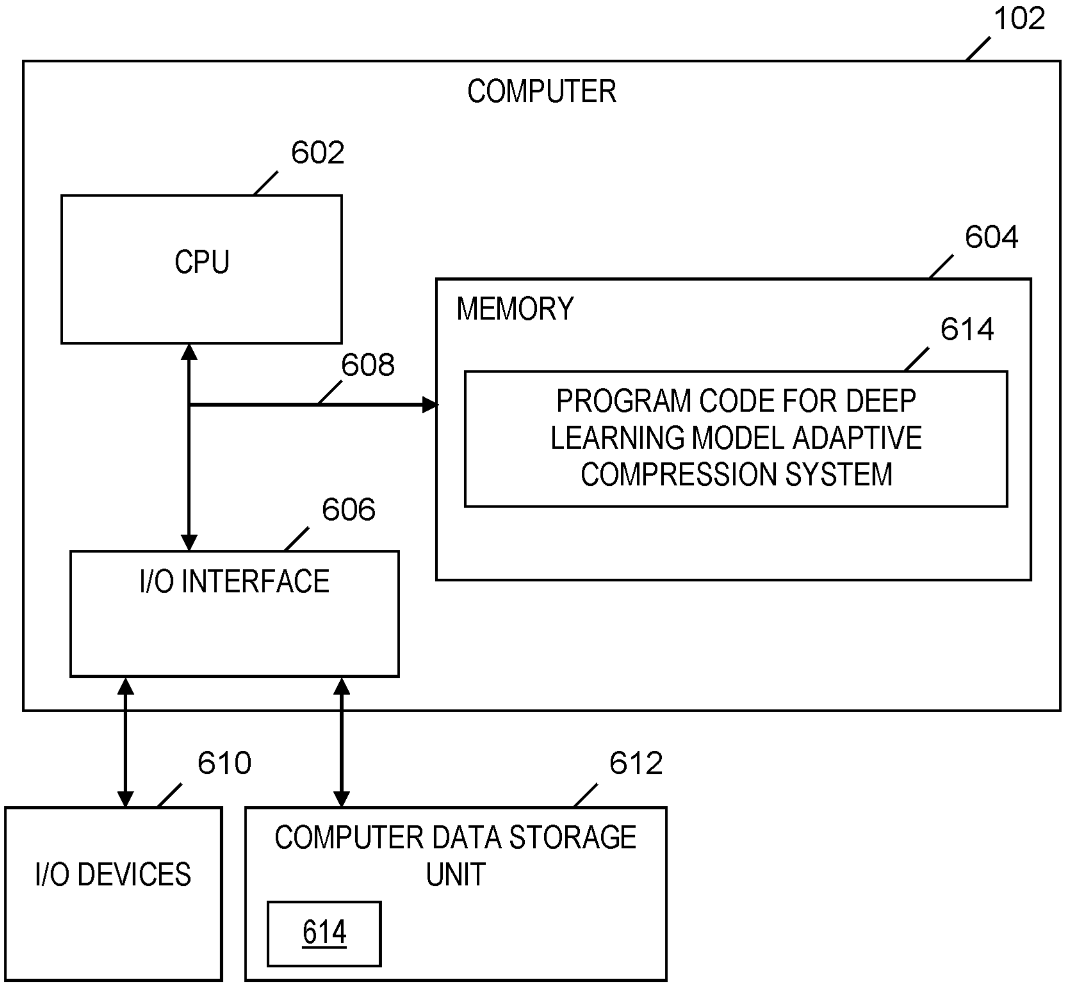
FIG. 6 is a block diagram of a computer that is included in the system of FIG. 1 and that implements the processes of FIG. 2 and FIG. 3, in accordance with embodiments of the present invention.

FIG. 6 is a block diagram of a computer that is included in the system of FIG. 1 and that implements the processes of FIG. 2 and FIG. 3, in accordance with embodiments of the present invention. Computer 102 is a computer system that generally includes a central processing unit (CPU) 602, a memory 604, an input/output (I/O) interface 606, and a bus 608. Further, computer 102 is coupled to I/O devices 610 and a computer data storage unit 612. CPU 602 performs computation and control functions of computer 102, including executing instructions included in program code 614 for deep learning model adaptive compression system 104 (see FIG. 1) to perform a method of adaptively compressing a deep learning model, where the instructions are executed by CPU 602 via memory 604. CPU 602 may include a single processing unit or processor or be distributed across one or more processing units or one or more processors in one or more locations (e.g., on a client and server).

Memory 604 includes a known computer readable storage medium, which is described below. In one embodiment, cache memory elements of memory 604 provide temporary storage of at least some program code (e.g., program code 614) in order to reduce the number of times code must be retrieved from bulk storage while instructions of the program code are executed. Moreover, similar to CPU 602, memory 604 may reside at a single physical location, including one or more types of data storage, or be distributed across a plurality of physical systems or a plurality of computer readable storage media in various forms. Further, memory 604 can include data distributed across, for example, a local area network (LAN) or a wide area network (WAN).

I/O interface 606 includes any system for exchanging information to or from an external source. I/O devices 610 include any known type of external device, including a display, keyboard, etc. Bus 608 provides a communication link between each of the components in computer 102, and may include any type of transmission link, including electrical, optical, wireless, etc.

I/O interface 606 also allows computer 102 to store information (e.g., data or program instructions such as program code 614) on and retrieve the information from computer data storage unit 612 or another computer data storage unit (not shown). Computer data storage unit 612 includes one or more known computer readable storage media, where a computer readable storage medium is described below. In one embodiment, computer data storage unit 612 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 604 and/or storage unit 612 may store computer program code 614 that includes instructions that are executed by CPU 602 via memory 604 to adaptively compress a deep learning model. Although FIG. 6 depicts memory 604 as including program code, the present invention contemplates embodiments in which memory 604 does not include all of code 614 simultaneously, but instead at one time includes only a portion of code 614.

Further, memory 604 may include an operating system (not shown) and may include other systems not shown in FIG. 6.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to adaptively compressing a deep learning model. Thus, an embodiment of the present invention discloses a process for supporting computer infrastructure, where the process includes providing at least one support service for at least one of integrating, hosting, maintaining and deploying computer-readable code (e.g., program code 614) in a computer system (e.g., computer 102) including one or more processors (e.g., CPU 602), wherein the processor(s) carry out instructions contained in the code causing the computer system to adaptively compress a deep learning model. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of adaptively compressing a deep learning model.

While it is understood that program code 614 for adaptively compressing a deep learning model may be deployed by manually loading directly in client, server and proxy computers (not shown) via loading a computer-readable storage medium (e.g., computer data storage unit 612), program code 614 may also be automatically or semi-automatically deployed into computer 102 by sending program code 614 to a central server or a group of central servers. Program code 614 is then downloaded into client computers (e.g., computer 102) that will execute program code 614. Alternatively, program code 614 is sent directly to the client computer via e-mail. Program code 614 is then either detached to a directory on the client computer or loaded into a directory on the client computer by a button on the e-mail that executes a program that detaches program code 614 into a directory. Another alternative is to send program code 614 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 614 is transmitted to the proxy server and then it is stored on the proxy server.

Another embodiment of the invention provides a method that performs the process steps on a subscription, advertising and/or fee basis. That is, a service provider can offer to create, maintain, support, etc. a process of adaptively compressing a deep learning model. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 604 and computer data storage unit 612)

having computer readable program instructions 614 thereon for causing a processor (e.g., CPU 602) to carry out aspects of the present invention.

The computer readable storage medium can be a tangible device that can retain and store instructions (e.g., program code 614) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 614) described herein can be downloaded to respective computing/processing devices (e.g., computer 102) from a computer readable storage medium or to an external computer or external storage device (e.g., computer data storage unit 612) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 614) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 2 and FIG. 3) and/or block diagrams (e.g., FIG. 1 and FIG. 6) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 614).

These computer readable program instructions may be provided to a processor (e.g., CPU 602) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 612) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 614) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
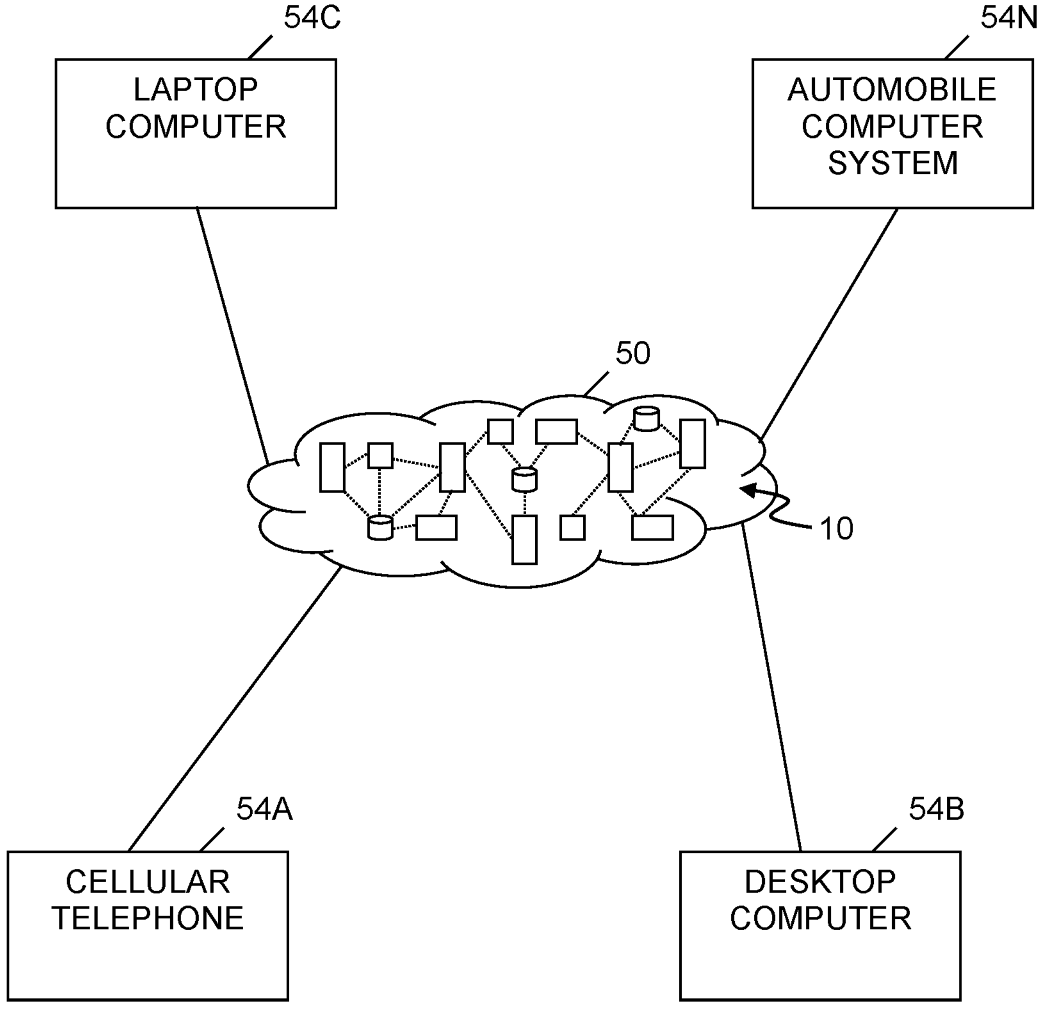
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
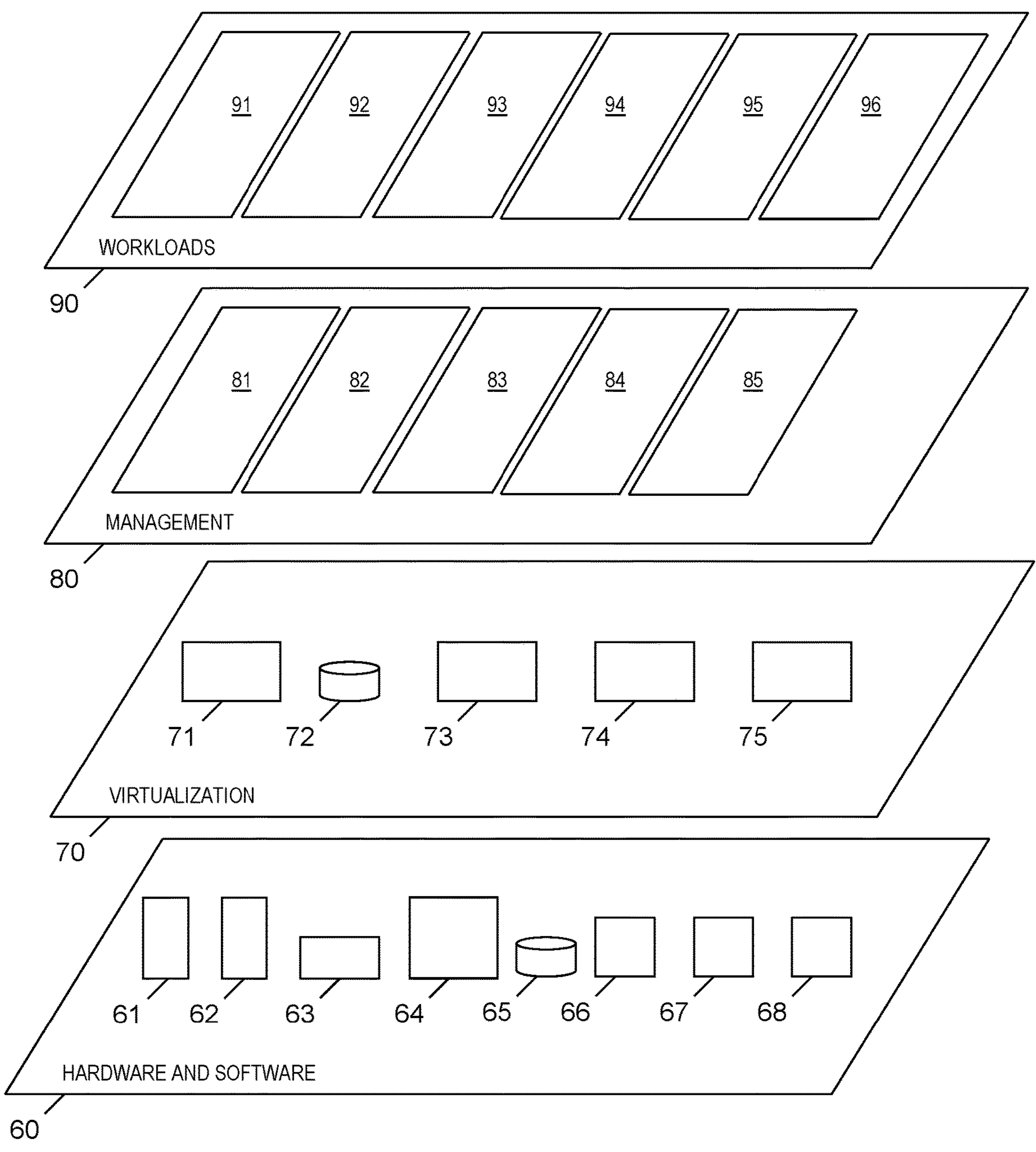
FIG. 8 depicts abstraction model layers, in accordance with embodiments of the present invention.

Referring now to FIG. 8, a set of functional abstraction layers provided by cloud computing environment 50 (see FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and adaptive compression for a deep learning model 96.

What is claimed is:

1. A computer system comprising:
one or more processors; and
one or more memory devices coupled to the one or more processors, wherein the one or more processors are configured to:
determine an original deep learning model corresponding to an Internet of Things (IoT) device;
collect device information from the IoT device, wherein the device information includes information corresponding to one or more of a device hardware, a frame size, and a network latency;
based on the collected device information, select a K-means engine, a tag-based engine, and a graph embedding engine;
determine a plurality of compression factor combinations by using (i) embedding vector similarity provided by the K-means engine, (ii) pattern type similarity provided by the tag-based engine, and (iii) a graph embedding method provided by the graph embedding engine, wherein each compression factor combination of the plurality of compression factor combinations corresponds to a respective combination of a plurality of model compression templates, wherein the plurality of model compression templates include low-rank factorization, convolutional filters, frequency domain converter, and knowledge distillation;
determine a plurality of compression ratios and a plurality of model accuracies corresponding to the plurality of compression factor combinations;
based on the plurality of compression ratios and the plurality of model accuracies, select a compression factor combination from the plurality of compression factor combinations;
generate a compressed deep learning model by compressing the original deep learning model by using model compression templates corresponding to the selected compression factor combination;
deploy the compressed deep learning model to the IoT devices;
identify a decrease in the accuracy of the deployed compressed deep learning model over a time period;
determine that a rate of the decrease over the time period exceeds a specified threshold rate;
based on the rate of the decrease exceeding the specified threshold rate, re-train the compressed deep learning model;
re-compress the re-trained compressed deep learning model to generate a re-compressed deep learning model; and
deploy the re-compressed deep learning model to the IoT devices.

2. The computer system of claim 1, wherein the one or more processors are configured to:
monitor an accuracy of the compressed deep learning model over a time period that exceeds a specified threshold amount of time, subsequent to the deploying the compressed deep learning model;
identify a decrease in the accuracy of the compressed deep learning model over the time period;
determine a rate of the decrease in the accuracy over the time period;
determine that the rate of the decrease over the time period does not exceed a specified threshold rate;
based on the rate of the decrease not exceeding the specified threshold rate, to perform a re-compression of the compressed deep learning model, the one or more processors are further configured to:
collect new device information from the IoT device;
select multiple recommendation engines from a plurality of recommendation engines;
determine new compression factor combinations by using the selected multiple recommendation engines;
determine a new plurality of compression ratios and a new plurality of model accuracies for new multiple compression factor combinations;
based on the new plurality of compression ratios and the new plurality of model accuracies, select a new compression factor combination from the new multiple compression factor combinations; and
generate a new compressed deep learning model by re-compressing the compressed deep learning model by using the new compression factor combination; and deploy the re-compressed compressed deep learning model to the IoT device.

3. The computer system of claim 1, wherein the one or more processors are configured to:

train the original deep learning model; and subsequent to the deploying the compressed deep learning model, monitor the accuracy of the deployed compressed deep learning model over the time period that exceeds a specified threshold amount of time.

4. The computer system of claim 1, wherein to generate the compressed deep learning model, the one or more processors are configured to provide an accuracy of the compressed deep learning model that is greater than or equal to an accuracy of the original deep learning model.

5. The computer system of claim 1, wherein to collect the device information from the IoT device, the one or more processors are configured to collect brands, hardware, network latencies, pattern types, and model layer sizes of the IoT devices.

6. The computer system of claim 1, wherein the one or more processors are further configured to:

weigh the plurality of compression ratios by a set of first weights and weigh the model accuracies by a set of second weights to generate a weighted plurality of compression ratios and a weighted plurality of model accuracies;

based on the weighted plurality of compression ratios and the weighted plurality of model accuracies, determine a plurality of scores for the plurality of compression factor combinations; and determine a greatest score among the plurality of scores, wherein selecting the selected compression factor combination includes selecting a compression factor combination that has the greatest score from the plurality of compression factor combinations.

7. A non-transitory computer-readable medium storing a set of instructions for wireless communication, the set of instructions comprising:

one or more instructions that, when executed by one or more processors of a device, cause the device to:

determine an original deep learning model corresponding to different Internet of Things (IoT) device;

collect device information from the IoT device, wherein the device information includes information corresponding to one or more of a device hardware, a frame size, and a network latency;

based on the collected device information, select a K-means engine, a tag-based engine, and a graph embedding engine;

determine, a plurality of compression factor combinations by using (i) embedding vector similarity provided by the K-means engine, (ii) pattern type similarity provided by the tag-based engine, and (iii) a graph embedding method provided by the graph embedding engine, wherein each compression factor combination of the plurality of compression factor combinations corresponds to a respective combination of a plurality of model compression templates, wherein the plurality of model compression templates include low-rank factorization, transferred compact convolutional filters, frequency domain converter, and knowledge distillation;

determine a plurality of compression ratios and a plurality of model accuracies corresponding to the plurality of compression factor combinations;

based on the plurality of compression ratios and the plurality of model accuracies, select a compression factor combination from the plurality of compression factor combinations;

generate a compressed deep learning model by compressing the original deep learning model by using model compression templates corresponding to the selected compression factor combination;

deploy the compressed deep learning model to the IoT devices;

identify a decrease in the accuracy of the deployed compressed deep learning model over a time period;

determine that a rate of the decrease over the time period exceeds a specified threshold rate;

based on the rate of the decrease exceeding the specified threshold rate, re-train the compressed deep learning model;

re-compress the re-trained compressed deep learning model to generate a re-compressed deep learning model; and deploy the re-compressed deep learning model to the IoT devices.

8. The non-transitory computer-readable medium of claim 7, wherein the one or more instructions cause the device to:

monitor an accuracy of the compressed deep learning model over a time period that exceeds a specified threshold amount of time, subsequent to the deploying the compressed deep learning model;

identify a decrease in the accuracy of the compressed deep learning model over the time period;

determine a rate of the decrease in the accuracy over the time period;

determine that the rate of the decrease over the time period does not exceed a specified threshold rate;

based on the rate of the decrease not exceeding the specified threshold rate, perform a re-compression of the compressed deep learning model by collecting new device information from the IoT device;

select multiple recommendation engines from a plurality of recommendation engines;

determine new compression factor combinations by using the selected multiple recommendation engines;

determine a new plurality of compression ratios and a new plurality of model accuracies for new multiple compression factor combinations;

based on the new plurality of compression ratios and the new plurality of model accuracies, select a new compression factor combination from the new multiple compression factor combinations;

generate a new compressed deep learning model by re-compressing the compressed deep learning model by using the new compression factor combination; and deploy the re-compressed compressed deep learning model to the IoT device.

9. The non-transitory computer-readable medium of claim 7, wherein the one or more instructions cause the device to:

train the original deep learning model; and subsequent to the deploying the compressed deep learning model, monitor the accuracy of the deployed compressed deep learning model over the time period that exceeds a specified threshold amount of time.

10. The non-transitory computer-readable medium of claim 7, wherein the one or more instructions, to cause the device to generate the compressed deep learning model, cause the device to provide an accuracy of the compressed deep learning model that is greater than or equal to an accuracy of the original deep learning model.

11. The non-transitory computer-readable medium of claim 7, wherein the one or more instructions, to cause the device to collect the device information from the IoT device, cause the device to collect brands, hardware, network latencies, pattern types, and model layer sizes of the IoT devices.

12. The non-transitory computer-readable medium of claim 7, wherein the one or more instructions, to cause the device to:

weigh the plurality of compression ratios by a first set of weights and weigh the plurality of model accuracies by a second set of weights to generate a weighted plurality of compression ratios and a weighted plurality of model accuracies;

based on the weighted plurality of compression ratios and the weighted plurality of model accuracies, determine a plurality of scores for the plurality of compression factor combinations; and determine a greatest score among the plurality of scores, wherein selecting the selected compression factor combination includes selecting a compression factor combination that has the greatest score from the plurality of compression factor combinations.

13. The non-transitory computer-readable medium of claim 7, wherein the K-means engine, the tag-based engine, and the graph embedding engine are selected from a plurality of recommendation engines.

14. A computer-implemented method comprising:

determining, by one or more processors, an original deep learning model corresponding to an Internet of Things (IoT) device;

collecting, by the one or more processors, device information from the IoT device, wherein the device information includes information corresponding to one or more of a device hardware, a frame size, and a network latency;

based on the collected device information, selecting, by the one or more processors, a K-means engine, a tag-based engine, and a graph embedding engine;

determining, by the one or more processors, a plurality of compression factor combinations by using (i) embedding vector similarity provided by the K-means engine, (ii) pattern type similarity provided by the tag-based engine, and (iii) a graph embedding method provided by the graph embedding engine, wherein each compression factor combination of the plurality of compression factor combinations corresponds to a respective combination of a plurality of model compression templates, wherein the plurality of model compression templates include low-rank factorization, transferred compact convolutional filters, frequency domain converter, and knowledge distillation;

determining, by the one or more processors, a plurality of compression ratios and a plurality of model accuracies corresponding to the plurality of compression factor combinations;

based on the plurality of compression ratios and the plurality of model accuracies, selecting, by the one or more processors, a compression factor combination from the plurality of compression factor combinations;

generating, by the one or more processors, a compressed deep learning model by compressing the original deep learning model by using model compression templates corresponding to the selected compression factor combination;

deploying, by the one or more processors, the compressed deep learning model to the IoT devices;

identifying a decrease in the accuracy of the deployed compressed deep learning model over a time period;

determining that a rate of the decrease over the time period exceeds a specified threshold rate;

based on the rate of the decrease exceeding the specified threshold rate, re-training the compressed deep learning model;

re-compressing the re-trained compressed deep learning model to generate a re-compressed deep learning model; and deploying the re-compressed deep learning model to the IoT devices.

15. The computer-implemented method of claim 14, further comprising:

subsequent to the deploying the compressed deep learning model, monitoring, by the one or more processors, an accuracy of the compressed deep learning model over a time period that exceeds a specified threshold amount of time;

identifying, by the one or more processors, a decrease in the accuracy of the compressed deep learning model over the time period;

determining, by the one or more processors, a rate of the decrease in the accuracy over the time period;

determining, by the one or more processors, that the rate of the decrease over the time period does not exceed a specified threshold rate; and based on the rate of the decrease not exceeding the specified threshold rate, performing, by the one or more processors, a re-compression of the compressed deep learning model by:

collecting new device information from the IoT device;

selecting-multiple recommendation engines from a plurality of recommendation engines;

determining new compression factor combinations by using the selected-multiple recommendation engines;

determining a new plurality of compression ratios and a new plurality of model accuracies for new multiple compression factor combinations;

based on the new plurality of compression ratios and the new plurality of model accuracies, selecting a new compression factor combination from the new multiple compression factor combinations; and generating a new compressed deep learning model by re-compressing the compressed deep learning model by using the new compression factor combination; and deploying the re-compressed compressed deep learning model to the IoT device.

16. The computer-implemented method of claim 14, further comprising:

training, by the one or more processors, the original deep learning model;

subsequent to the deploying the compressed deep learning model, monitoring, by the one or more processors, the accuracy of the deployed compressed deep learning model over the time period that exceeds a specified threshold amount of time; and identifying, by the one or more processors, a decrease in the accuracy of the compressed deep learning model over the time period.

17. The computer-implemented method of claim 14, wherein the generating the compressed deep learning model includes providing, by the one or more processors, an accuracy of the compressed deep learning model that is greater than or equal to an accuracy of the original deep learning model.

18. The computer-implemented method of claim 14, wherein the collecting the device information from the IoT device includes collecting, by the one or more processors, brands, hardware, network latencies, pattern types, and model layer sizes of the IoT devices.

19. The computer-implemented method of claim 14, further comprising:

weighting, by the one or more processors, the plurality of compression ratios by a first set of weights and weighting the plurality of model accuracies by a second set of weights to generate a weighted plurality of compression ratios and a weighted plurality of model accuracies;

based on the weighted plurality of compression ratios and the weighted plurality of model accuracies, determining, by the one or more processors, a plurality of scores for the plurality of compression factor combinations; and determining, by the one or more processors, a greatest score among the plurality of scores, wherein selecting the selected compression factor combination includes selecting a compression factor combination that has the greatest score from the plurality of compression factor combinations.

* * * * *